(12) United States Patent
Terakado et al.

(10) Patent No.: US 7,039,934 B2
(45) Date of Patent: May 2, 2006

(54) RECORDING SYSTEM

(75) Inventors: Tomoko Terakado, Kanagawa (JP); Masahiko Sato, Tokyo (JP); Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 937 days.

(21) Appl. No.: 09/732,005

(22) Filed: Dec. 7, 2000

(65) Prior Publication Data

US 2001/0014898 A1  Aug. 16, 2001

(30) Foreign Application Priority Data

Dec. 10, 1999  (JP)  ................................... 11-351579

(51) Int. Cl.
*H04N 5/445* (2006.01)

(52) U.S. Cl. ............................. 725/37; 725/58; 725/78; 725/141; 386/83; 709/318

(58) Field of Classification Search ................ 725/109, 725/110, 37, 58, 78, 141; 709/318, 217, 709/224, 201, 203; 386/83, 46
See application file for complete search history.

(56) References Cited

U.S. PATENT DOCUMENTS 6,725,281 B1 *  4/2004  Zintel et al. ................ 709/217

\* cited by examiner

*Primary Examiner*—Vincent F. Boccio
(74) *Attorney, Agent, or Firm*—Frommer Lawrence & Haug LLP; William S. Frommer; Thomas F. Presson (57) ABSTRACT

A recording system includes an information receiver having a function of decoding a general-purpose data-description language, and a recorder having a data recording region for recording data from the information receiver and a document-type-definition recording region for recording at least document-type-definition information on the general-purpose data-description language. When being linked to the information receiver, the recorder transmits the recorded document-type-definition information to the information receiver, and the information receiver transmits, based on the received document-type-definition information, predetermined data to the recorder.

24 Claims, 5 Drawing Sheets

RECORDING SYSTEM

BACKGROUND OF THE INVENTION

1. Field of the Invention

The present invention relates to recording systems, and in particular, to a recording system in which linked apparatuses perform data recording, using a general-purpose data-description language which is understood and commonly used.

2. Description of the Related Art

A hard disk recorder as a recording unit included in a conventional recording system, and an information receiver such as a set-top box (STB) for recording communication satellite broadcasts are known. In recording methods thereof, a predetermined format is used to perform recording and reading.

By way of example, when receiving a broadcast program, the information receiver accumulatively records, based on a data format unique to the receiver, the data of the received program on a recording medium or in a buffer. The data of the received program are transmitted to a recording unit connected to the receiver by using a transmission method employing a predetermined protocol. The recording unit captures the data of the program in accordance with the transmission method employing the predetermined protocol. The recording unit accumulatively stores, based on its unique data format, the captured data on a recording medium.

The recording unit and the information receiver can communicate with each other by using a predetermined fixed format. However, each cannot convert its unique data format into another.

SUMMARY OF THE INVENTION

Accordingly, it is an object of the present invention to provide a recording system in which different apparatuses commonly use a recording format and in which the apparatuses commonly use a function or a data format when it is added to one of the apparatuses.

To this end, according to an aspect of the present invention, the foregoing object is achieved through provision of a recording system including an information receiver having a function of decoding a general-purpose data-description language, and a recorder having a data recording region for recording data from the information receiver and a document-type-definition recording region for recording at least document-type-definition information on the general-purpose data-description language. When being linked to the information receiver, the recorder transmits the recorded document-type-definition information to the information receiver, and the information receiver transmits, based on the received document-type-definition information, predetermined data to the recorder.

Preferably, when the recorder is initially linked to the information receiver, the recorder transmits the document-type-definition information to the information receiver.

When receiving the document-type-definition information, the information receiver may extract a predetermined command from among commands defined by the document type definition of the information, and may access the recorder as instructed by the extracted command.

After being extracted, the predetermined command may be used as a transmission-request command to the recorder.

An information description stored in the recorder may include metadata.

The document-type-definition information in the recorder may comprise a plurality of document type definitions.

The recorder may include a hard disk drive.

The information receiver may be a set-top box or an information apparatus.

The general-purpose data-description language may be the extensible markup language.

According to another aspect of the present invention, the foregoing object is achieved through provision of a recording system including an information receiver having a function of decoding a general-purpose data-description language, and a recorder having a data recording region for recording data from the information receiver and a document-type-definition recording region for recording at least a document type definition of the general-purpose data-description language, the recorder also having a function of decoding the general-purpose data-description language. The information receiver transmits document-type-definition information created in the general-purpose data-description language to the recorder, and based on the received document-type-definition information, the recorder performs recording to the data recording region and/or the setting of a display mode.

Preferably, when the information receiver is initially linked to the recorder, the information receiver transmits the document-type-definition information to the recorder.

The recording to the data recording region may be based on a data format included in the received document-type-definition information.

Preferably, when transmitting the document-type-definition information, the information receiver extracts a predetermined command from among commands defined by the document type definition of the information, and accesses the recorder as instructed by the extracted command.

After being extracted, the predetermined command may be used as a transmission-request command to the recorder.

The document-type-definition information recorded in the recorder may include metadata.

The document-type-definition information in the information receiver which can be transmitted to the recorder may comprise a plurality of document type definitions.

The recorder may include a hard disk drive.

The information receiver may be a set-top box or an information apparatus.

The general-purpose data-description language may be the extensible markup language.

According to the present invention, by sending document-type-definition information from an apparatus to another apparatus which are linked to each other, a data format, etc., can be commonly used and understood. Therefore, a single data format can be employed between the apparatuses, which employ different data formats, and the apparatuses can cope with a situation in which a change or an addition is made to a function or a data format of one apparatus.

DESCRIPTION OF THE PREFERRED EMBODIMENTS

A recording system according to an embodiment of the present invention is described below with reference to the accompanying drawings.

Figure 1:
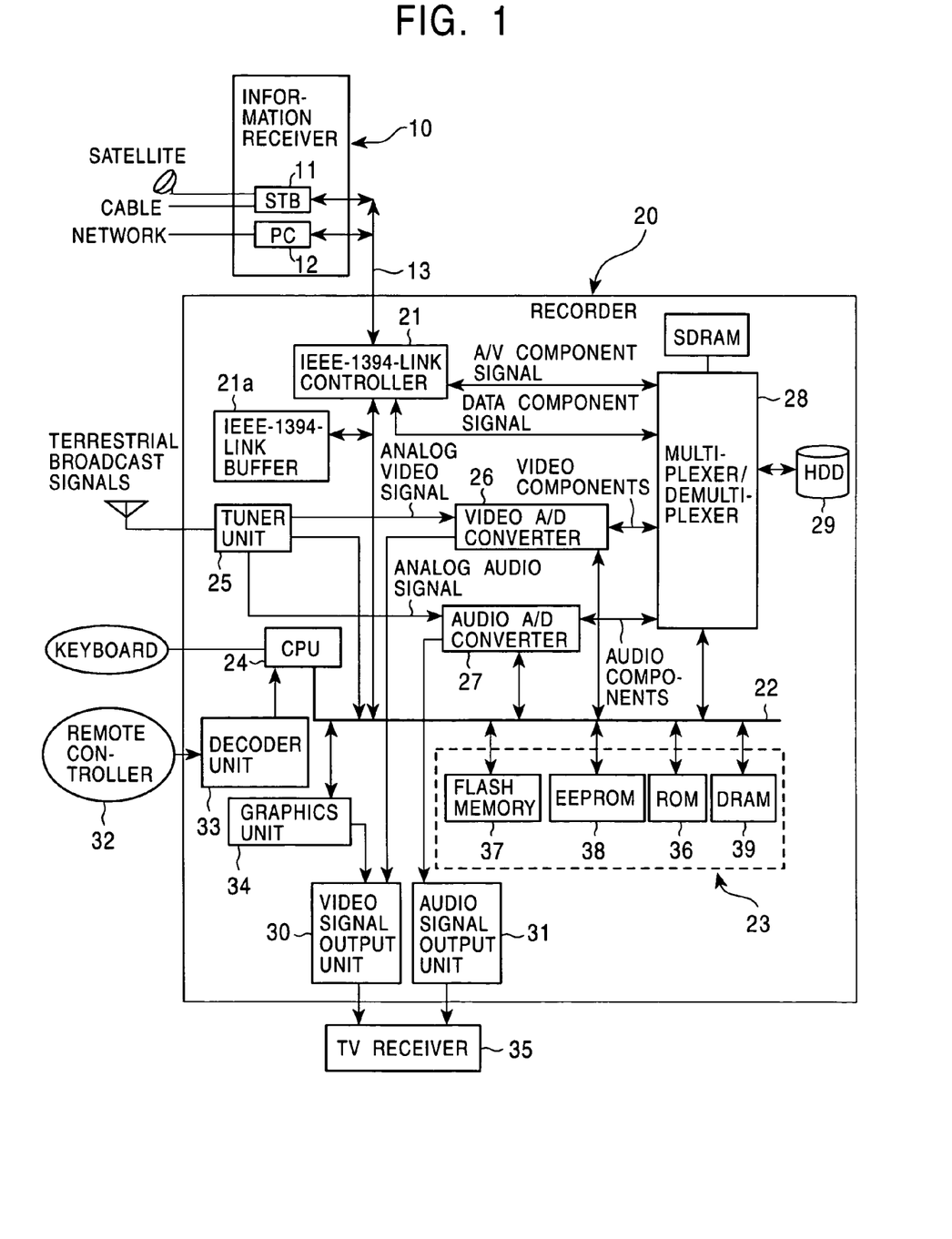
FIG. 1 is a block diagram showing an information receiver 10 and a recorder 20 which constitute a recording system according to an embodiment of the present invention.

Referring to FIG. 1, the recording system includes an information receiver 10 having a function of decoding a general-purpose data-description language (the extensible markup language (XML) in this embodiment), and a recorder 20 that has a data recording region for recording data from the information receiver 10 and a document-type-definition recording region for recording at least one document type definition (DTD) of a general-purpose data-description language. The document-type-definition recording region can have at least one or a plurality of document type definitions. By preparing a plurality of document type definitions, as described, for example, by preparing a plurality of document type definitions for forming different data formats, a data format adapted for the form of data to be received can be used.

The information receiver 10 has a function of transmitting/receiving document-type-definition information to/from the recorder 20 when the information receiver 10 is linked to the recorder 20. The information receiver 10 also has a function of transmitting predetermined data based on document-type-definition information when it is received from the recorder 20. Specifically, when receiving the document-type-definition information, the information receiver 10 extracts a predetermined command based on the document-type-definition information, and can access, in accordance with instructions of the extracted command, the recorder 20, which employs a predetermined data format. After the predetermined command is extracted, it can be used as a transmission-request command for accessing the recorder 20. This enables the establishment of a common protocol and compatibility between the information receiver 10 and the recorder 20. The information receiver 10 includes an STB 11 for receiving satellite broadcasts and cable television programs, and an information apparatus (e.g., a personal computer) 12 for receiving or downloading data from a network, for example, the Internet. The information receiver 10 can be linked to the recorder 20 by an IEEE 1394 link 13 (e.g., "i.Link" (trademark) of Sony Corporation). The IEEE 1394 link 13 may be of either a wireless or wired type.

The recorder 20 includes a hard disk drive (HDD) or a recordable digital versatile disk (DVD-R) drive. The recorder 20 has a function of transmitting stored document-type-definition information in its document-type-definition recording region to the information receiver 10, or an inverse function. In the data recording region of the recorder 20, a plurality of events and components can be recorded. The events and components are recorded in an arranged form based on a predetermined method so that their contents can be used in common. By transmitting the contents of the events to the information receiver 10, they can be also used by the information receiver 10.

The recorder 20 specifically includes an IEEE-1394-link controller 21 for receiving information from the information receiver 10 via the IEEE 1394 link 13, an IEEE-1394-link buffer 21a for temporarily storing data that is input or output via the IEEE 1394 link 13, a storage unit 23 for storing data from the IEEE-1394-link controller 21 via an address/data bus 22, a central processing unit (CPU) 24 for controlling the address/data bus 22, a tuner unit 25 for receiving terrestrial broadcast signals, a video analog-to-digital (A/D) converter 26 for converting analog video signals received by the tuner unit 25 into digital signals, an audio analog-to-digital (A/D) converter 27 for converting analog audio signals received by the tuner unit 25 into digital signals, a multiplexer/demultiplexer 28 that transmits/receives an audio-visual (A/V) component signal and a data component signal from the IEEE-1394-link controller 21, a video component signal from the video A/D converter 26, and an audio component signal from the audio A/D converter 27, an HDD 29 connected to the multiplexer/demultiplexer 28, a synchronous dynamic random access memory (SDRAM) that is connected to the multiplexer/demultiplexer 28 and that temporarily stores data obtained when network information is recorded or read, a video signal output unit 30 for outputting the analog video signal from the video A/D converter 26, an audio signal output unit 31 for outputting the analog audio signal from the audio A/D converter 27, a decoder 33 for receiving operation signals from a remote controller 32, and a graphics unit 34 for displaying information, etc., which is recorded in the HDD 29. The video signal output unit 30 and the audio signal output unit 31 are connected to a television (TV) receiver 35.

The address/data bus 22 is controlled by the CPU 24, and controls data from the IEEE-1394-link controller 21, data from the video A/D converter 26, data from the audio A/D converter 27, data from the graphics unit 34, data in the storage unit 23, and data in the multiplexer/demultiplexer 28. The storage unit 23 consists of a read only memory (ROM) 36 containing basic software, a flash memory 37 containing application software, electrically erasable, programmable read-only memory (EEPROM) 38 for storing various parameters used when the HDD 29 operates, and a dynamic random-access memory (DRAM) 39 used as a working memory and a temporary information memory.

Figure 2:
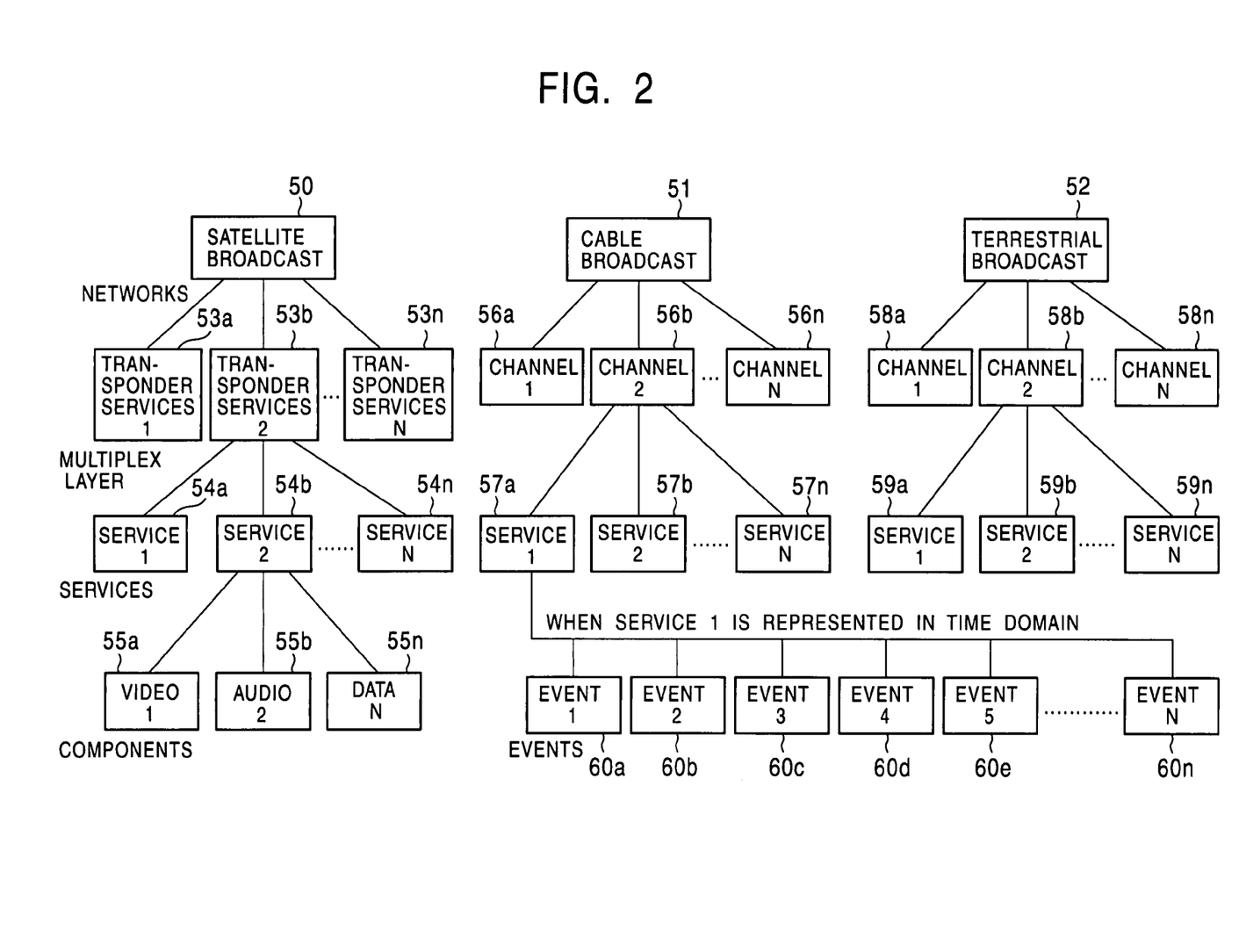
FIG. 2 is a block diagram showing a service delivery model having a layered network structure.

The information receiver 10 in the above-described recording system can construct, in accordance with a receiving mode, a so-called "service delivery model" having a layered structure composed of networks, a multiplex layer, services, components, and events in the order given, as shown in FIG. 2.

In the service delivery model, the layer of networks includes a satellite broadcast 50, a cable broadcast 51, and a terrestrial broadcast 52.

The multiplex layer below the satellite broadcast 50 consists of transponders 1 to N (53a to 53n).

Each transponder consists of services 1 to N (54a to 54n) which are at a lower level. Each service is formed by, for example, a provider.

Each service consists of components such as video 1 (55a), audio 2 (55b), and data N (55n).

When each service is represented in the time domain, a plurality of events exist. Each event can specify and can refer to a DTD and a style sheet indicating a display mode. This point is described later.

The multiplex layer below the cable broadcast 51 consists of a plurality of channels 1 to N (56a to 56n). Each of the channels 1 to N (56a to 56n) consists of a plurality of services (e.g., services 1 to N (57a to 57n)). The services 1 to N (57a to 57n) are formed by, for example, providers.

Each of the services 1 to N (57a to 57n) consists of video 1, audio 2, and data N (which are not shown) similar to those in the case of the satellite broadcast 50.

When each of the services 1 to N (57a to 57n) is represented in the time domain, a plurality of events (e.g., events 1 to N (60a to 60n)) exist. Each of the events 1 to N (60a to 60n) can specify and can refer to a DTD and a style sheet indicating a display mode.

The multiplex layer below the terrestrial broadcast 52 consists of channels 1 to N (58a to 58n).

Each of the channels 1 to N (58a to 58n) consists of services 1 to N (59a to 59n). The services 1 to N (59a to 59n) are formed by, for example, providers.

Each of the services 1 to N (59a to 59n) consists of lower level components such as video 1, audio 2, and data N (which are not shown).

When each service is represented in the time domain, a plurality of events 1 to N (60a to 60n) (which are not shown) exist similarly to the case of the cable broadcast 51. Each of the events 1 to N (60a to 60n) can specify and can refer to a DTD and a style sheet indicating a display mode.

Figure 3:
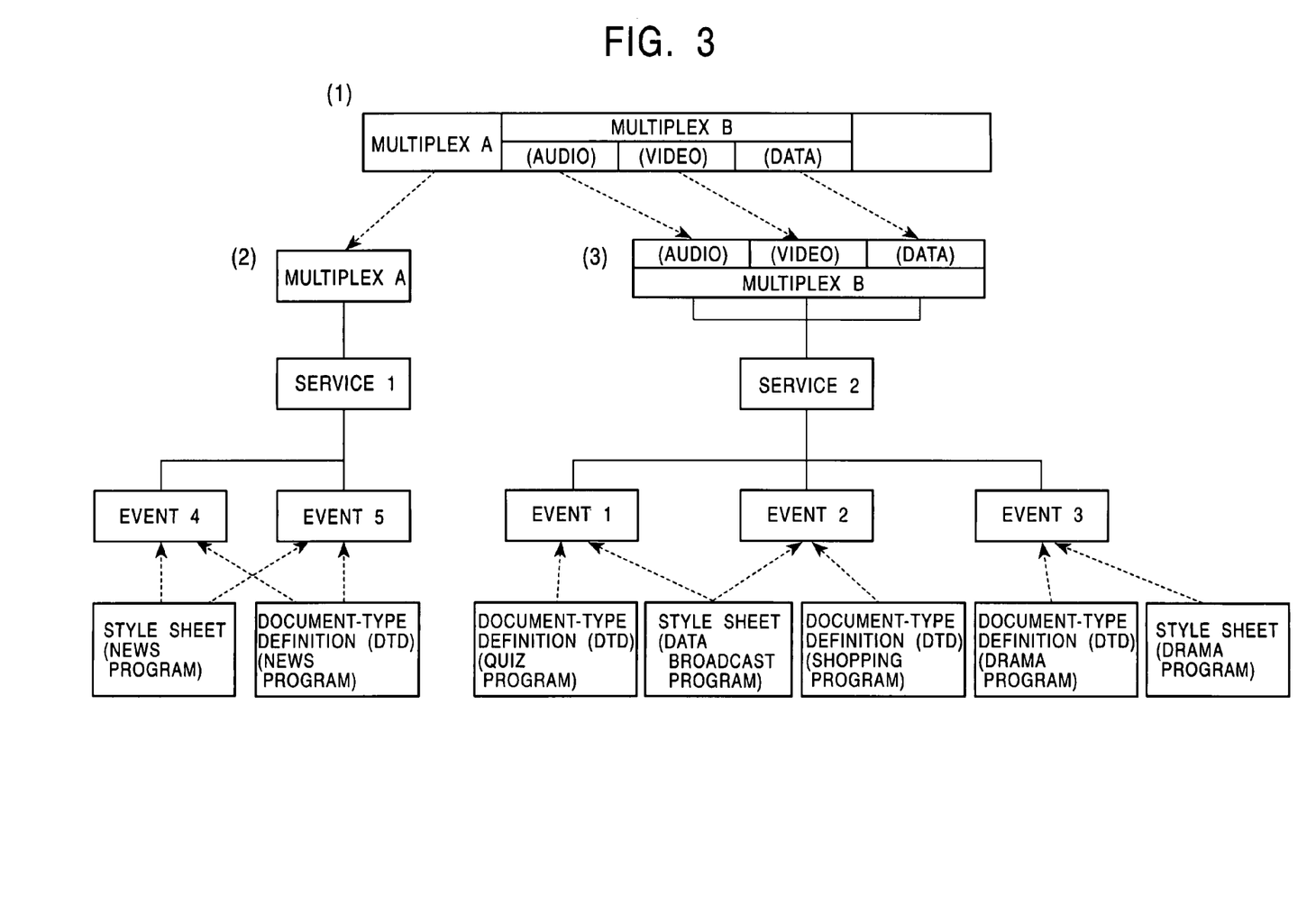
FIG. 3 is a block diagram showing the relationship between a service delivery model having a layered network structure and the recorder 20 shown in FIG. 1.

Each event in the above-described layered structure is defined by a general-purpose data-description language, specifically by the DTD of the XML in this embodiment. FIG. 3 shows a layered definition of each event in the service delivery model. In Multiplex A, service 1 consists of events 4 and 5 which are at a lower level. Events 4 and 5 have a style sheet and a DTD for a news program, respectively. Multiplex B defines audio, video, and data. In event 1 below service 2, a DTD defines a quiz program, and a style sheet defines a data broadcast program. In event 2, a DTD defines a shopping program, and the style sheet defines a data broadcast program. In event 3, a DTD defines a drama program and a style sheet defines the drama program.

As described above, as for a news program, a display mode and a DTD which are adapted for the news program can be specified. Also, a plurality of events can refer to a single display mode and a single DTD. Not only an event but also a network, a multiplex layer, a service, and a component can specify and can refer to a display mode and a DTD.

Referring to the entire structure of XML, XML consists of (1) an XML declaration, (2) a DTD, and (3) and XML instance. (1) The XML declaration simply performs an XML version declaration and a character code declaration. (2) The DTD declares a document type, namely, document elements represented by tags and a layered structure of the elements, and an attribute as information added to the elements. This declaration basically consists of four declarations called "markup declarations": "element type declaration", "attribute list declaration", "entity declaration", and "description form declaration", which define a document type relating to the use of tags. The element type declaration defines usable elements and specifies element names and a layered structure. The attribute list declaration defines an attribute as added information to elements, and indicates what type of attribute corresponds to which of elements, what the attribute name is, what is specified as an attribute value, whether attribute specifying is essential, and what can be specified as a default attribute value. The entity declaration is a description that declares an entity such as an external file or a replaced character string. This declaration is divided into two types: "general entity" and "parameter entity", which are part of the DTD. The description form declaration is a declaration having a data description form for non-XML data, and is represented by description forms such as the graphics interchange format (GIF), the computer graphics metafile (CGM), and TeX. (3) The XML instance is a portion in which an actual tag-added document is written.

The style sheet is a specification for providing an XML element with style information for display and printing modes and is described in a style description language. The XML element is one unit of a logical structure defined for each type of document, and is represented by a start tag and an end tag.

Next, with reference to FIG. 4, the definition of a common data format in the layered delivery model structure for use in the recording system is described below, using the information receiver 10 and the recorder 20.

In the HDD 29, there are the data recording region for recording broadcast data, etc., and the document-type-definition recording region that describes networks, multiplex layers, services, events, components, and the DTD. The volume size of the document-type-definition recording region is determined by the storage capacity of the HDD 29.

The document-type-definition recording region contains data formats for writing data to the data recording region. The data formats are defined by a layered structure composed of "Networks_format" (100), "Multiplexes_format" (200), "Services_format" (300), "Events_format" (400), "Components_format" (500), "Definition_format" (600), and "Style_format" (700).

Figure 4:
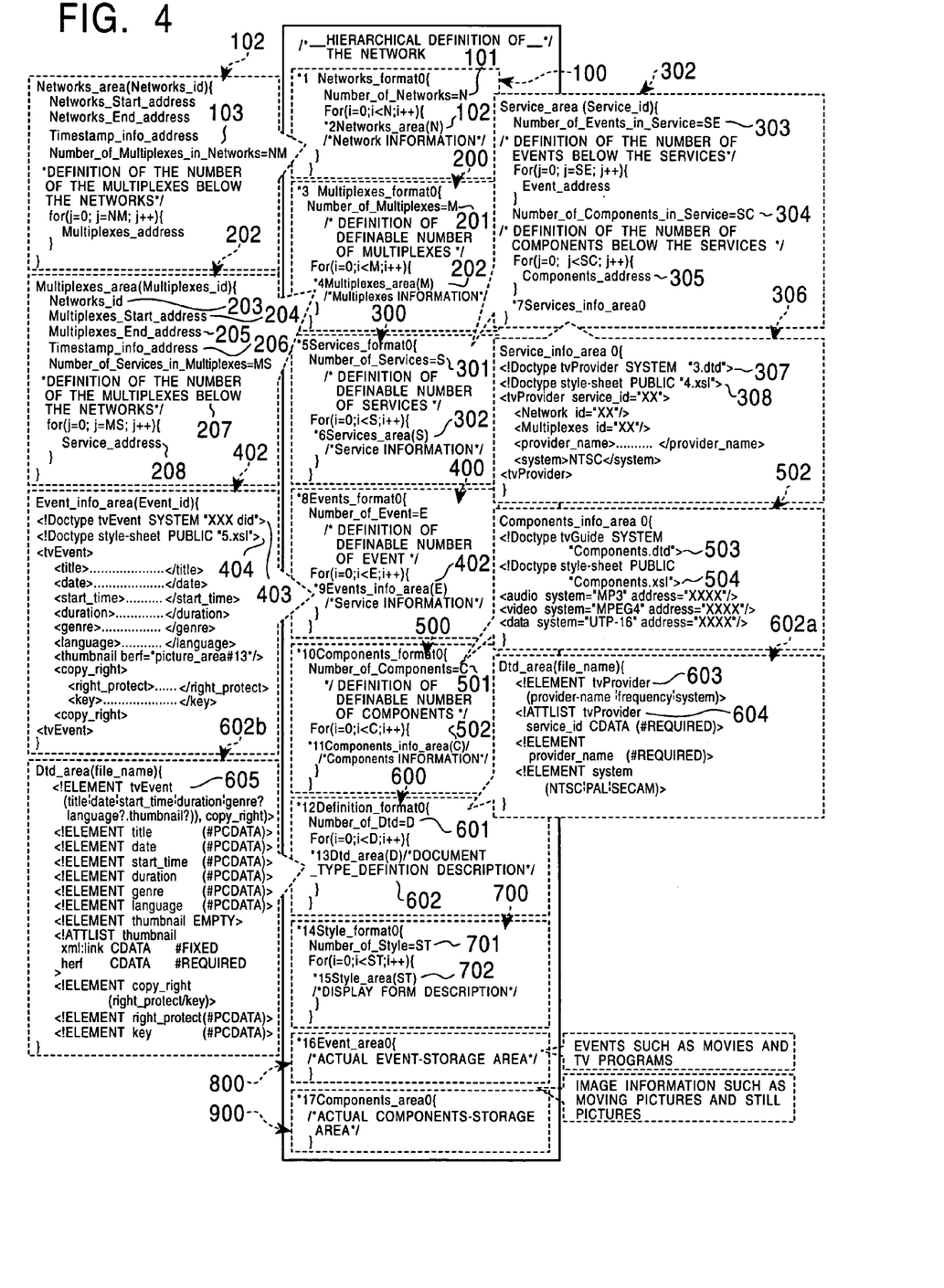
FIG. 4 is an illustration of data formats described in the XML as a general-purpose data-description language in the recording system shown in FIG. 1, which has a function of receiving satellite broadcasts.

In each of these formats (100 to 700), as shown in FIG. 4, "Number_of_(layer elements)" is used to indicate the number of contents. The number of layer elements in "Networks_format" (100) is represented by "Number_of_Networks" (101). The number of layer elements in "Multiplexes_format" (200) is represented by "Number_of_Multiplexes" (201). The number of layer elements in "Services_format" (300) is represented by "Number_of_Services" (301). The number of layer elements in "Events_format" (400) is represented by "Number_of_Events" (401). The number of layer elements in "Components_format" (500) is represented by "Number_of_Components" (501). The number of layer elements in "Definition_format" (600) is represented by "Number_of_Dtd" (601). The number of layer elements in "Style_format" (700) is represented by "Number_of Style" (701).

Subsequently to the designation of the number of layer elements in each of the formats 100 to 700, information in an area for each format is defined. Information for "Networks_format" (100) is defined by "Networks_area" (102) for storing network information. Information for "Multiplexes_format" (200) is defined by "Multiplexes_area" (202) for storing multiplexes information. Information for "Services_format" (300) is defined by "Services_area" (302) for storing services information. Information for "Events_format" (400) is defined by "Event_info_area" (402) for storing event information. Information for "Components_format" (500) is defined by "Components_info_area" (502) for storing components information. Information for "Definition_format" (600) is defined by "Dtd_area" (602) for storing a description of a document type definition. Information for "Style_format" (700) is defined by "Style_area" (702) for storing a display form description.

The definitions 102 to 702 are followed by definitions (settings) of lower level layers.

In "Networks_area" (102), the number of multiplex layers (e.g., transponders in digital satellite broadcasting) below the network is set by "Number_of_Multiplexes_in_Networks" (103).

"Multiplexes_area" (202) contains "Networks_id" (203) for indicating a multiplex layer attribute, "Multiplexes_Start_address" (204) for indicating a multiplex layer start, "Multiplexes_End_address" (205) for indicating a multiplex layer end, "Timestamp_info_address" (206) for performing time management of data-sending date and time, and "Number_of_Services_in_Multiplexes" (207) for indicating the number of services below the multiplex layer. Service addresses can be set corresponding to the number of services which is set in "Number_of_Services_in_Multiplexes" (207). "Service address" (208) designates the position of "Service_area" (302).

"Service_area" (302) defines the number of events (programs) below the service and the number of components (video, audio, data, etc.) below the service. Event addresses can be set corresponding to a number set in "Number_of_Events_in_Service" (303), and component addresses can be set corresponding to a number set in "Number_of_Components_in_Service" (304). "Components_address" (305) specifies the address of "Event_info_area" (402) for setting event information, the address of "Event_area" (800) for specifying an area for storing events such as movies and TV programs, and the address of "Components_area" (900) for specifying an area for storing image information such as moving and still pictures.

"Service_info_area" (306) which describes an area for storing service information, "Event_info_area" (402) which describes an area for storing event information, and "Components_info_area" (502) which describes an area for storing component information are described in the XML which is a metalanguage (metadata). That the metalanguage is used is similar to a case in which, by mainly specifying the names of tags for use in XML instance in a DTD and layering-relationship among the tags, or an attribute for a start tag and the data type of an attribute value, one language to be used in the XML instance is specified.

Next, in each of "Service_info_area" (306), "Components_ info_area" (502), and "Event_info_area" (402), a DTD on a tag structure described in the metalanguage is described. In this embodiment, the DTD is declared by "DOCTYPE", and a file name ((file name).dtd) for specifying a file is added.

A DTD in "Service_info_area" (306) declares <!Doctype tvProvider SYSTEM "3.dtd"> and <!Doctype style-sheet PUBLIC "4.xsl"> (308).

A DTD in "Components_info_area" (502) declares <!Doctype tvGuide SYSTEM "Components.dtd"> (503) and <!Doctype style-sheet PUBLIC "Components.xsl"> (504).

A DTD in "Event_info_area" (402) declares <!Doctype tvEvent SYSTEM "XXX.dtd"> (403) and <!Doctype style-sheet PUBLIC "5.xsl"> (404).

In addition, a document by a DTD declaration is defined as described above, and an element type declaration is performed in ELEMENT representing the attribute of an element defined in "Dtd_area" (602a).

"Dtd_area" (602a) which corresponds to "tvprovider" declared in "Service_info_area" (306) declares <!ELEMENT tvProvider (provider_name|frequency|system)> (603) and <!ATTLIST tvProvider . . . >, and subsequently declares a provider name, a broadcast type, etc.

"Dtd_area" (602b) which corresponding to "tvEVENT" declared in "Event_info_area" (402) declares <!ELEMENT tvEVENT . . . > (605), subsequently declares a title, a date, a start time, etc., which are event information.

As described above, by creating a common layered data format, data transmitted from the information receiver 10 to the recorder 20 is written based on the data format. When the common data format is created, the following cases are considered (1) in which the DTD of XML data is created by the information receiver 10 and is received and written in the recorder 20, (2) in which the DTD of XML data is created by the CPU 24 and is written in the HDD 29 in the recorder 20, and (3) in which a DTD written in the ROM 36 when it was shipped is written in the HDD 29.

Concerning an XML described in each of "Service_info_area" (306), "Event_info_area" (402), and "Components_info_area" (502) among the XML-based data formats, the following cases are considered (1) in which the XML is created by the information receiver 10 and is received and written in the recorder 20, (2) in which the XML is created by the CPU 24 and is written in the HDD 29 in the recorder 20, and (3) in which an XML written in the ROM 26 when it was shipped is written in the HDD 29. In addition, each case can be provided with a copyright protection function for preventing copyright and copying of each event.

Figure 5A:
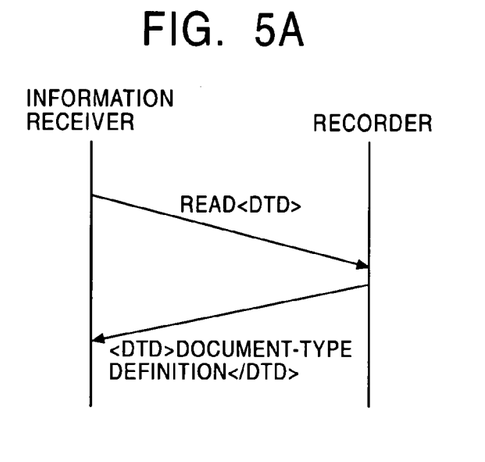
FIGS. 5A, 5B, 5C, and 5D are illustrations of document type definitions and information-reading/writing protocol which are employed between the information receiver 10 and the recorder 20 (both shown in FIG. 1).

By storing common data formats in the document-type-recording region in the recorder 20, and/or storing the formats in the information receiver 10, and executing the data formats, as required, when data writing is performed, data can be written or read based on a created data format. In order to transmit or receive data adapted for the data format, also the information receiver 10 must use the same format to transmit or receive data. This point is described below using the following cases:

(1) In the case where the information receiver 10 reads a DTD in the recorder 20, when the information receiver 10 uses the IEEE 1394 link 13 to transmit, to the recorder 20, a reading command extracted from a DTD of "READ<DTD>", the recorder 20 responds by sending the tags of "<DTD>document type definition</DTD>" having the DTD content provided therebetween, as shown in FIG. 5A. In this technique, if the information receiver 10 and the recorder 20 initially have different data formats, the use of a single DTD at the beginning of linkage between the information receiver 10 and the recorder 20 can make the data formats identical. This is that the use of a data format in common can be achieved. When a change, an addition, etc., are made to a content, a very simplified technique can maintain compatibility.

Figure 5B:
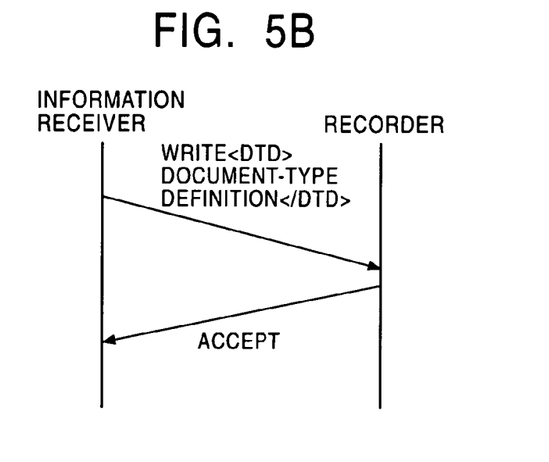

(2) In the case where a DTD is written in the recorder 20, the information receiver 10 uses the IEEE 1394 link 13 to send, to the recorder 20, a command for transmitting the tags of "<DTD>document type definition</DTD>" having the DTD content provided therebetween, as shown in FIG. 5B. The recorder 20 acknowledges receipt by sending an "ACCEPT" signal or the like. In this technique, by transmitting a DTD in the information receiver 10 to the recorder 20, a single data format is used to perform writing and reading, for example, even when the recorder 20 is replaced by a new one. When the information receiver 10 transmits the DTD to the recorder 20, the recorder 20 can perform, based on a data format included in the DTD, data recording and reading, and the setting of a particular display mode. After transmitting the DTD to a particular apparatus (e.g., the recorder 20), the information receiver 10 extracts a command from the transmitted DTD, and accesses the recorder 20 as instructed by the extracted command. After the command is extracted, it is used as a transmission-request command to the recorder 20, whereby the establishment of a protocol and the maintenance of compatibility can be achieved.

In addition, information in the recorder 20, for example, information in a document-type-definition recording region can be sent, for example, to an external apparatus, for example, the information receiver 10. Conversely, the desired information can be received from an external apparatus.

Figure 5C:
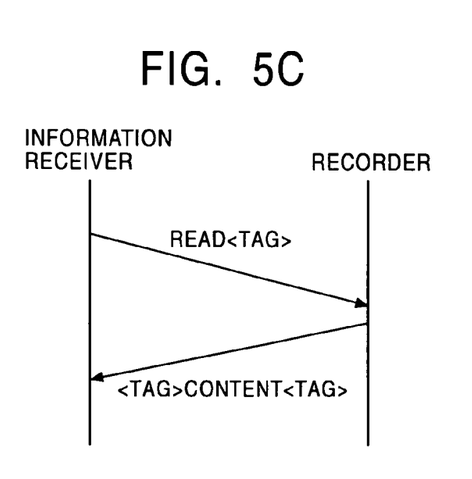

(3) In the case where information in the recorder 20 is read by the information receiver 10, when the information receiver 10 uses the IEEE 1394 link 13 to transmit a command of "READ<TAG>" for reading the information in the recorder 20, the recorder 20 responds by sending the tags of "<TAG>CONTENT<TAG>" having the information (the content of the designated tag) in the recorder 20 provided between the tags, as shown in FIG. 5C. Since the information receiver 10 captures necessary information from the recorder 20, as required, it can set definitions adapted for the specifications of the recorder 20.

Figure 5D:
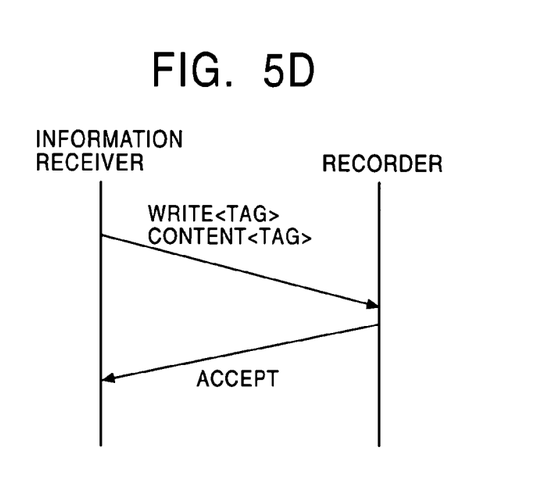

(4) In the case where certain information in the information receiver 10 is written in the recorder 20, the information receiver 10 uses the IEEE 1394 link 13 to transmit both a command for writing the information between the tags of "WRITE<TAG>CONTENT<TAG>" and the information. The recorder 20 acknowledges receipt by sending an "ACCEPT" signal. In this technique, the recorder 20 captures, as required, information from an apparatus to which the recorder 20 is connected. This enables the recorder 20 to flexibly cope with a situation in which a new function is added.

What is claimed is:

1. A recording system comprising:
    an information receiver having a function of decoding a general-purpose data-description language; and
    a recorder having a data recording region for recording a plurality of events and components from said information receiver and a document-type-definition recording region for recording at least document-type-definition information on said general-purpose data-description language,
    wherein said plurality of events and components are recorded in an arranged form based on a predetermined method,
    wherein, when being linked to said information receiver, said recorder transmits the recorded document-type-definition information to said information receiver, and said information receiver transmits, based on the received document-type-definition information, predetermined data to said recorder, that permits the receiver and the recorder to use the predetermined data, and
    wherein, when the information receiver and the recorder have different data formats, the document-type-definition information at a beginning of a linkage causes data conversion to a single format.

2. A recording system according to claim 1, wherein, when said recorder is initially linked to said information receiver, said recorder transmits the document-type-definition information to said information receiver.

3. A recording system according to claim 1, wherein, when receiving the document-type-definition information, said information receiver extracts a predetermined command from among commands defined by the document type definition of the information, and accesses said recorder as instructed by the extracted command.

4. A recording system according to claim 3, wherein, after being extracted, said predetermined command is used as a transmission-request command to said recorder.

5. A recording system according to claim 1, wherein an information description stored in said recorder includes metadata.

6. A recording system according to claim 1, wherein the document-type-definition information in said recorder comprises a plurality of document type definitions.

7. A recording system according to claim 1, wherein said recorder includes a hard disk drive.

8. A recording system according to claim 1, wherein said information receiver is a set-top box or an information apparatus.

9. A recording system according to claim 1, wherein said general-purpose data-description language is the extensible markup language.

10. A recording system comprising:
    an information receiver having a function of decoding a general-purpose data-description language; and
    a recorder having a data recording region for recording a plurality of events and components from said information receiver and a document-type-definition recording region for recording at least a document type definition of said general-purpose data-description language said recorder also having a function of decoding said general-purpose data-description language,
    wherein said plurality of events and components are recorded in an arranged form based on a predetermined method,
    wherein said information receiver transmits document-type-definition information created in said general-purpose data-description language to said recorder, that permits the information receiver and the recorder to use the document-type definition information, and based on the received document-type-definition information, said recorder performs recording to said data recording region and/or the setting of a display mode,
    wherein, when the information receiver and the recorder have different data formats, the document-type-definition information at a beginning of a linkage causes data conversion to a single format.

11. A recording system according to claim 10, wherein, when said information receiver is initially linked to said recorder, said information receiver transmits the document-type-definition information to said recorder.

12. A recording system according to claim 10, wherein, when transmitting the document-type-definition information, said information receiver extracts a predetermined command from among commands defined by the document type definition of the information, and accesses said recorder as instructed by the extracted command.

13. A recording system according to claim 10, wherein, after being extracted, said predetermined command is used as a transmission-request command to said recorder.

14. A recording system according to claim 10, wherein the document-type-definition information recorded in said recorder includes metadata.

15. A recording system according to claim 10, wherein the document-type-definition information in said information receiver which can be transmitted to said recorder comprises a plurality of document type definitions.

16. A recording system according to claim 10, wherein said recorder includes a hard disk drive.

17. A recording system according to claim 10, wherein said information receiver is a set-top box or an information apparatus.

18. A recording system according to claim 10, wherein said general-purpose data-description language is the extensible markup language.

19. A recording system according to claim 1, wherein the general-purpose data-description language prevents unauthorized copying of the plurality of events and components.

20. A recording system according to claim 10, wherein the general-purpose data-description language prevents unauthorized copying of the plurality of events and components.

21. A recording system comprising:
an information receiver adapted to decode mark-up language data; and
a recording device, having a first storage area adapted to store recordable data and a second storage area adapted to store command data,
wherein said recordable data comprises a plurality of events and components which are recorded in an arranged form based on a predetermined method,
wherein the recording device transmits the command data to the information received and the information receiver extracts one or more predetermined commands from the command data and the information receiver access the recording device as a function of the one or more predetermined commands, and
wherein, when the information receiver and the recorder have different data formats, the document-type-definition information at a beginning of a linkage causes data conversion to a single format.

22. A recording system according to claim 21, wherein, after being extracted, the one or more predetermined commands are used as a transmission-request command to the recording device.

23. A recording system comprising:
an information receiver adapted to decode a mark-up language; and
a recorder having a first data recording region for recording data from said information receiver and a second data recording region for recording command data of the mark-up language, the recorder adapted to decode the mark-up language,
wherein said recording data from said information receiver comprises a plurality of events and components which are recorded in an arranged form based on a predetermined method,
wherein said information receiver transmits command data created in the mark-up language to the recorder and the recorder performs recording to the first data recording region as a function of the command data,
wherein, when the information receiver and the recorder have different data formats, the document-type-definition information at a beginning of a linkage causes data conversion to a singe format.

24. A recording system according to claim 23 wherein the information receiver extracts one or more predetermined commands from the command data and the information receiver accesses the recorder as a function of the one or more predetermined commands.

* * * * *